(12) United States Patent
Friedlander et al.

(10) Patent No.: US 8,418,184 B2
(45) Date of Patent: Apr. 9, 2013

(54) USE OF CONSTRAINT-BASED LINEAR PROGRAMMING TO OPTIMIZE HARDWARE SYSTEM USAGE

(75) Inventors: Robert R. Friedlander, Southbury, CT (US); Richard Hennessy, Austin, TX (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 138 days.

(21) Appl. No.: 12/890,309

(22) Filed: Sep. 24, 2010

(65) Prior Publication Data

US 2012/0079493 A1    Mar. 29, 2012

(51) Int. Cl.
*G06F 9/46* (2006.01)
(52) U.S. Cl.
USPC .......................................................... 718/104
(58) Field of Classification Search .................... 718/104
See application file for complete search history.

(56) References Cited

U.S. PATENT DOCUMENTS

| | | | |
|---|---|---|---|
| 6,167,405 A | 12/2000 | Rosensteel et al. | |
| 6,269,365 B1 | 7/2001 | Kiyoki et al. | |
| 6,353,818 B1 | 3/2002 | Carino, Jr. | |
| 7,019,740 B2 | 3/2006 | Georgalas | |
| 7,047,253 B1 | 5/2006 | Murthy et al. | |
| 7,152,070 B1 | 12/2006 | Musick et al. | |
| 7,191,183 B1 | 3/2007 | Goldstein | |
| 7,523,118 B2 | 4/2009 | Friedlander et al. | |
| 2001/0051881 A1 | 12/2001 | Filler | |
| 2003/0212664 A1 | 11/2003 | Breining et al. | |
| 2005/0188088 A1* | 8/2005 | Fellenstein et al. | 709/226 |
| 2007/0174840 A1 | 7/2007 | Sharma et al. | |

OTHER PUBLICATIONS

U.S. Appl. No. 11/416,973—Non-Final Office Action Mailed Mar. 21, 2008.
L. Haas et al., "IBM Federated Database Technology", IBM Developer Works Library, Mar. 1, 2002, pp. 1-10.
M. Lurie, "The Federation-Database Interoperability," IBM Developer Works Library, Apr. 24, 2003, pp. 1-15.
P. Mell et al., "The NIST Definition of Cloud Computing", Version 15, National Institute of Standards and Technology, Information Technology Laboratory, Oct. 7, 2009.

* cited by examiner

*Primary Examiner* — Mengyao Zhe
(74) *Attorney, Agent, or Firm* — John R. Pivnichny; Law Office of Jim Boice (57) ABSTRACT

A computer implemented method, system, and/or computer program product optimizes systems usage. A work request is decomposed into units of work. A processor selectively sends each unit of work from the work request to either a first system or a second system for execution, depending on a work constraint on each unit of work and/or system constraints on the first and second systems.

19 Claims, 5 Drawing Sheets

USE OF CONSTRAINT-BASED LINEAR PROGRAMMING TO OPTIMIZE HARDWARE SYSTEM USAGE

BACKGROUND

The present disclosure relates to the field of computers, and specifically to the use of computers to access hardware systems. Still more particularly, the present disclosure relates to the use of computers in enabling access to various hardware systems based on constraints to work units and/or the various systems.

BRIEF SUMMARY

A computer implemented method, system, and/or computer program product optimizes systems usage. A work request is decomposed into units of work. A processor selectively sends each unit of work from the work request to either a first system or a second system for execution, depending on a work constraint on each unit of work and/or system constraints on the first and second systems.

DETAILED DESCRIPTION

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
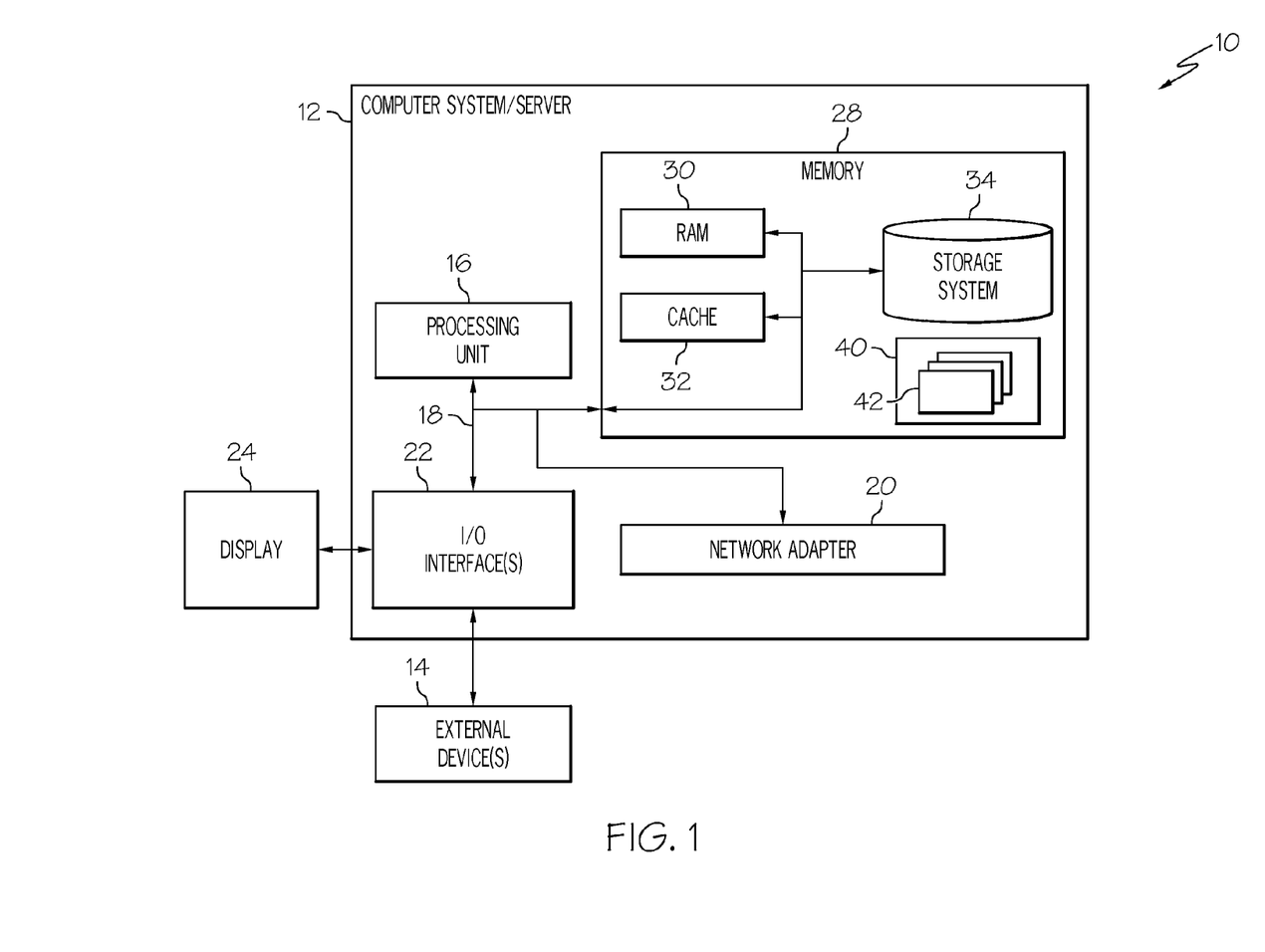
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 comprises a variety of computer system readable media. Such media may be any available media that is accessible by computer system/server 12, and it includes both volatile and non-volatile media, removable and non-removable media.

In one embodiment, system memory 28 comprises computer system readable media in the form of volatile memory, such as random, access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 comprise computer program instructions that are stored in memory 28 and/or storage system 34. These computer program instructions, when executed in processing units 16 via system memory 28, generally carry out the functions and/or methodologies of embodiments of the invention as described herein, including, but not limited to, those functions described in FIG. 4.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
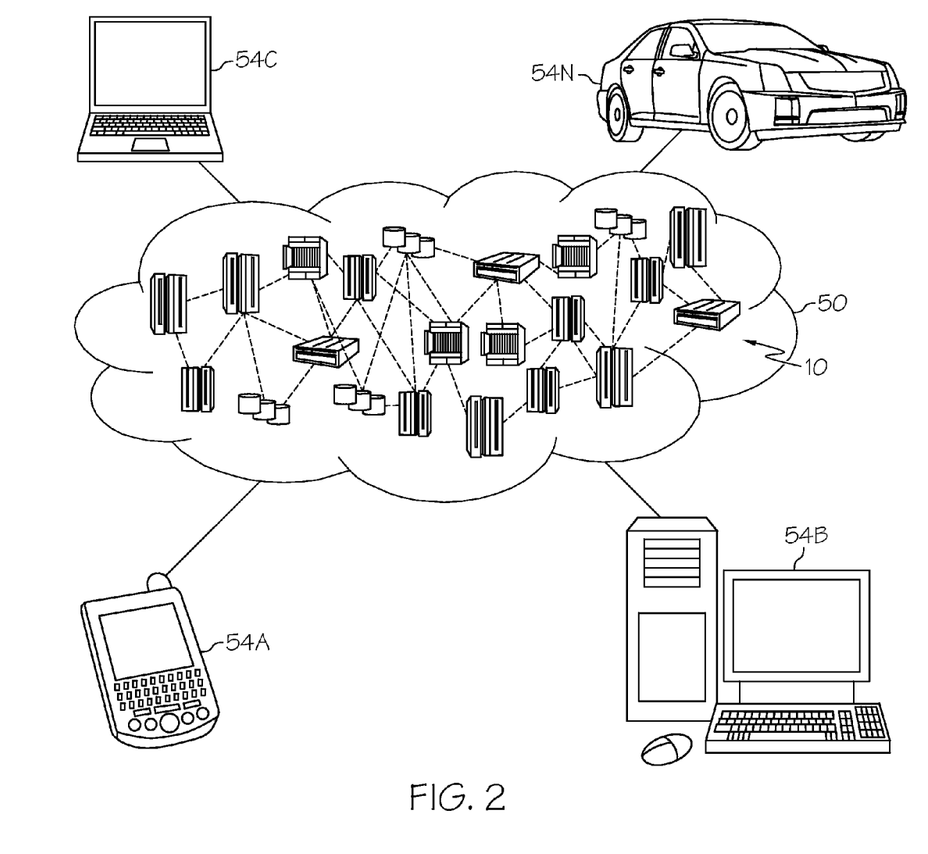
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
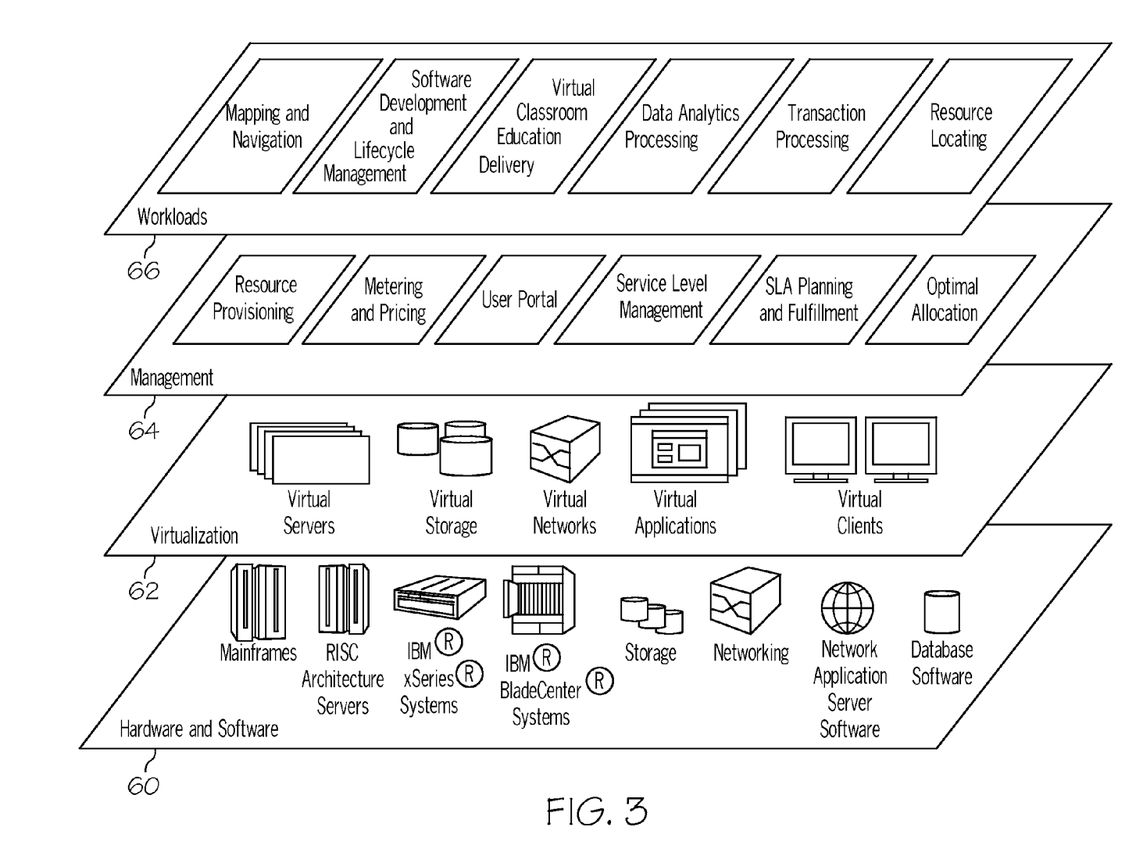
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and resource locating.

Figure 4:
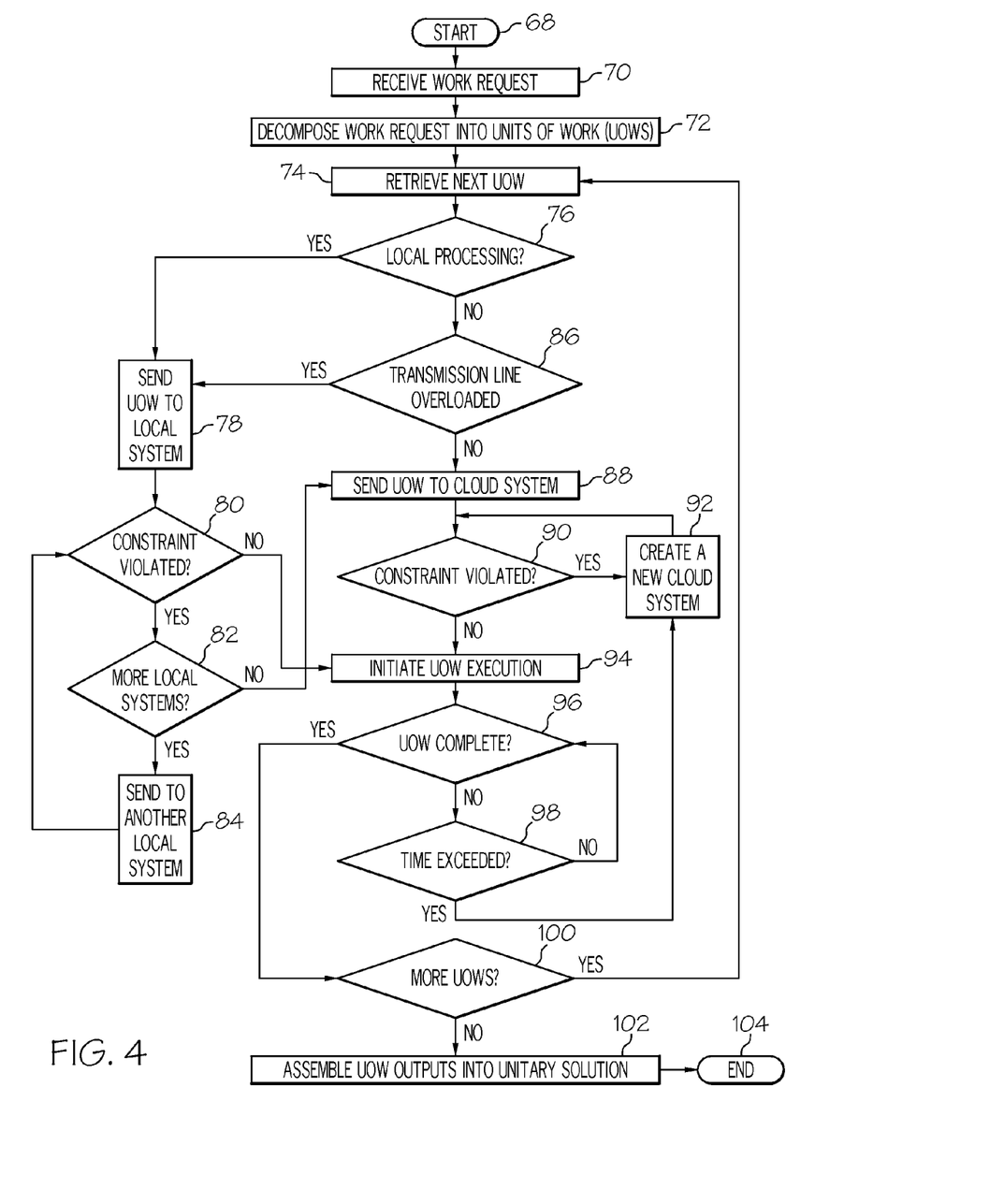
FIG. 4 is a high level flow chart of one or more exemplary steps taken by a processor to optimize cloud usage.

With reference again to management layer 64, the present disclosure describes optimal allocation of resources, and more specifically to the optimal utilization of various systems, including cloud systems. With reference now to FIG. 4, a high-level flow chart of one or more exemplary steps taken by a processor to optimize hardware system usage is presented. After initiator block 68, a work request is received (block 70) by a processor, such as that depicted in FIG. 1 as processing unit 16 of computer system/server 12. This work request may be from an input via an input device (i.e., a keyboard, etc.) via I/O interface 22, or it may come directly to a system bus in the computer system/server 12 via the network adapter 20. Note that while computer system/server 12 is described above as part of cloud computing node 10, the present disclosure utilizes computer system/server 12 as both a component of a cloud, as well as a non-cloud (locally executing) system.

The work request described in block 70 may be for an overall project, such as an inventory report, a profit and loss statement, a payroll report, etc. As described in block 72, that work request is then decomposed into units of work (UOWs). These UOWs are work modules that, when performed, create a unitary product (i.e., the final inventory report, profit and loss statement, etc.). Exemplary UOWs are for performing data base retrievals, large scale computations, summarizations, data analysis, data encryption, etc.

As described in block 74, one of the multiple UOWs created in block 72 is retrieved. A query is made (query block 76) regarding whether this UOW can and/or must be executed by a particular system, such as at a local system. For example, there may be a rule that data needed by this UOW may not be transmitted over a transmission line to a remote cloud system. Therefore, this UOW must be performed locally, by using a resource/system within a local area network (which is protected by a firewall), by the very same computer that requested and decomposed the work request, etc. If so (query block 76), then this UOW is executed on a local system (block 78).

If the UOW is not required to be processed locally, it can be transmitted to remote resources for processing, including those configured as a cloud system. Before transmission, a query is made as to whether the transmission line has available bandwidth to send the UOW to remote resources (query block 86). That is, a transmission line to a cloud system may have a maximum bandwidth. If this maximum bandwidth has been reached, then this UOW (and/or data supporting this UOW) must wait until adequate bandwidth becomes available. Rather than waiting for the transmission line to open up, it may be more advantageous to simply process this UOW locally (block 78). However, if the transmission line bandwidth is available, the UOW is transmitted to a cloud system (block 88).

The local system may have constraints of its own (query block 80). For example, a local system may be dedicated to processing classified work projects, and thus is not allowed to accept unclassified work projects, which could compromise the security of the local system. Similarly, the local system may be an unsecure system, which is not able to securely handle classified work projects (e.g., the current UOW). In another example, the local system may have certain local rules, such as prohibiting any data from being removed from the local system, from loading/removing more than a certain amount of data from a sub-unit of the local system, etc. If the first local system would have to violate its own constraint, then a search is made for 1) other local systems (query block 82 and block 84), or 2) it may be sent to a cloud resource (block 88).

Furthermore, the UOW itself may have certain constraints. For example, a particular UOW may require that no classified data be put on a network or sent to/from a cloud system. For example, a particular UOW may have a requirement/constraint that the selected system performs all calculations behind a firewall, and then only a non-confidential summary of these calculations are allowed to be distributed across the network/cloud. Similarly, there may be legal constraint on the UOW (e.g., a law such as the Health Insurance Portability and Accounting Act—HIPAA) that prohibits certain data from being executed in a non-secure system, such as a non-secure local system (in which non-secure data and processing reside), or on a non-secure cloud system. Thus, each UOW may have a work constraint that limits execution of the UOW to a system that is compliant with an execution environment rule for that UOW, such as a rule requiring that the execution environment be timely (i.e., the work be turned around within some predetermined length of time), be secure (e.g., be protected by a firewall, be dedicated to certain types of transactions/data, etc.), have requisite software resource to efficiently execute the UOW, be priced according to budget set by the rule, etc.

With respect to query blocks 80 and 90, if the constraint of the UOW is violated or the constraint of a resource is violated, then the UOW is sent to another local system (blocks 82-84) or a new cloud system is created (block 92). This second new cloud system is a reconfiguration of resources on a cloud network (described above). For example, the second new cloud system may be resources in a different time zone, thus removing workload constraints. That is, the first cloud system may be unduly constrained due to workloads during the present/local daytime hours, but resources from another part of the world (in another time zone) may be idle, since they are in a nighttime time zone. Similarly, the new cloud system may not have other constraints or characteristics that prevented the first cloud system from executing the UOW. For example, the new cloud system may be cheaper, and thus would not violate a price budget constraint for the UOW. This work constraint (price) can be overcome by sending that UOW to a local system, another local system, a first cloud system, a newly created second cloud system, etc., depending on whichever system is cheapest. Other UOW constraints (i.e., security constraints, time constraints, software constraints, etc.) are handled in a similar manner.

Note that one UOW derived from a work request may be processed by a first cloud system, while subsequent UOWs are executed on a second cloud system, which may have been configured using resources found in the first cloud system. For example, assume that local time is the middle of the night when a work request is received. In this example, the first UOW may execute on a local system and/or on a local cloud system. When the next UOW derived from the work request is ready to be executed, it may now be daytime locally. Thus, a second cloud system will be configured in a time zone where it is the middle of the night, thus taking advantage of resource availability, and possibly cheaper rates, to execute this next UOW.

With reference now to block 94, execution of a UOW initiates (either on the local system or a cloud system). If execution of this UOW does complete (query block 96) within a predetermined amount of time (query block 98), then, as described in block 92, a new cloud system is configured (or alternatively, a different local system is located and/or configured) and the current UOW is sent to this new system for execution. Note that in one embodiment, execution of the UOW in the first system (local or cloud) is stopped if the first system does not complete the execution on time. However, in another embodiment, the first system is allowed to continue working on the UOW, but the UOW is also sent to a second system (local or cloud). At this point, it becomes a "race" to see which system is able to complete the UOW execution first. Once one system completes the UOW execution, then execution on the UOW is stopped on the slower (losing) system.

Thus, various UOWs can be sent to various systems, depending on the constraints of the various UOWs and the constraints on the various systems. Once the execution of all UOWs derived from the work request is complete (query block 100), the work outputs for all of the UOWs from the various systems are assembled into a single, unitary solution (block 102), such as a final report, a final analysis, etc. The process then ends at terminator block 104.

Figure 5:
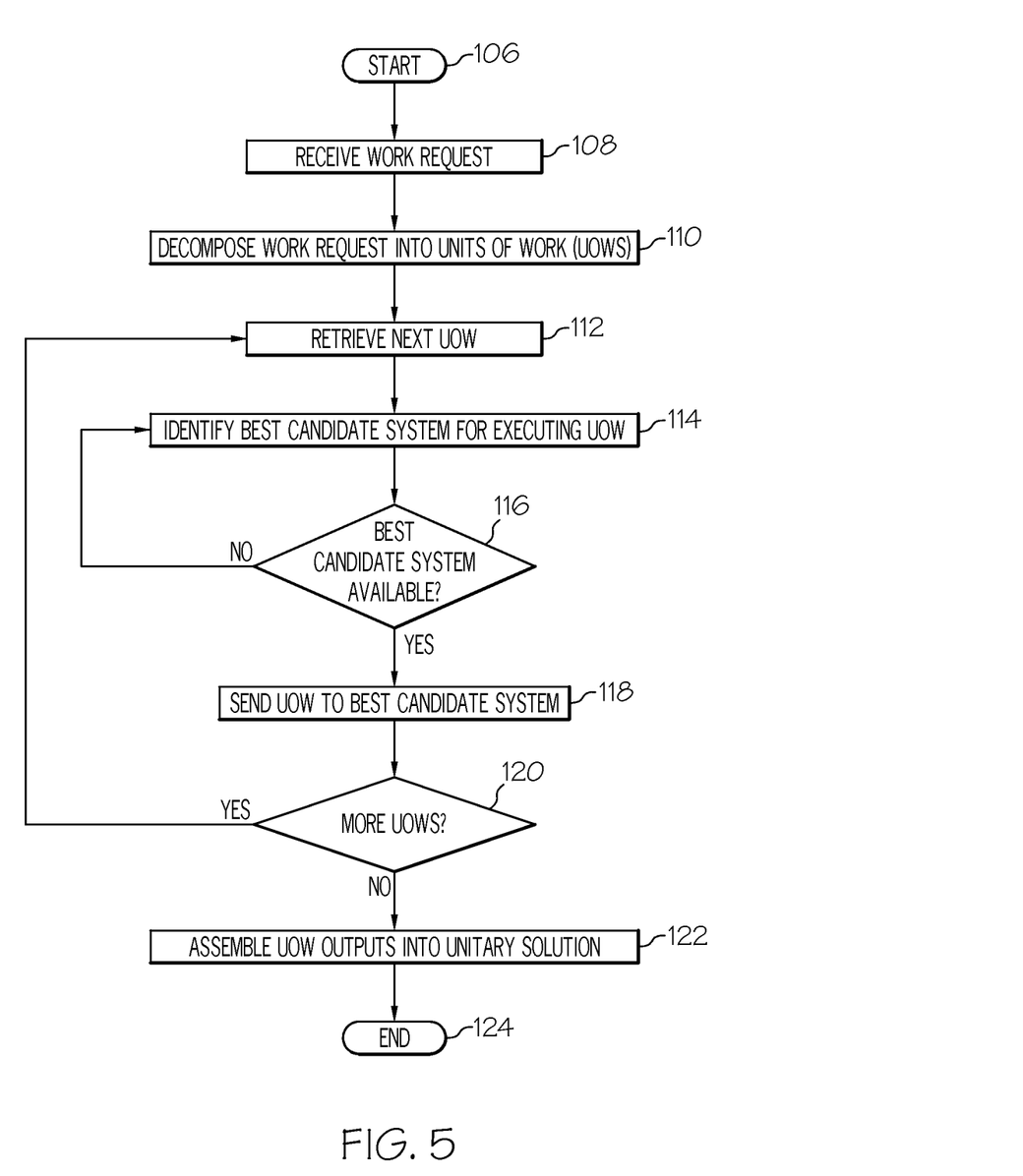
FIG. 5 is a high level flow chart of one or more exemplary steps taken by a processor to identify an optimal system for executing units of work from a work request.

FIG. 5 is a high level flow chart of one or more exemplary steps taken by a processor to identify an optimal system for executing units of work from a work request. After initiator block 106, a work request is received (block 108) by a processor. As described in block 110, that work request is then decomposed into units of work (UOWs). As described in block 112, one of the multiple UOWs created in block 110 is retrieved. At this point, a best candidate system for executing that UOW is identified (block 114). This best candidate system may be local, remote, and/or part of a cloud system. Identifying the best candidate system is performed using the constraint-based linear programming described above. That is, a linear program that describes the needs of that UOW is created, subject to constraints for that UOW. Alternatively, each UOW may be subject to parameters of a constraint-based linear program problem for the entire work request.

In one embodiment, an objective of the linear programming problem is to minimize the cost of executing the UOW/work request. An exemplary constraint for this objective may be to keep the cost below a certain price per CPU cycle, second, etc. or to keep the cost of executing the entire UOW and/or work request below a certain price.

In one embodiment, an objective of the linear programming problem is to minimize the amount of time required to execute the UOW/work request. An exemplary constraint for this object may be to complete the entire work request within a certain amount of time, to complete certain UOWs within a certain amount of time, etc. For example, one UOW in the work request may need to be completed before any other UOWs in the work request begin. Therefore, there may be a constraint set on the first UOW to execute quickly (in less than 5 seconds), while other UOWs in the work project may have more lax time constraints (execute in less than 5 minutes), especially if the UOWs are able to execute in parallel using different resources.

In one embodiment, an objective of the linear programming problem is to maximize the likelihood that a particular resource will be available at run-time to execute the UOW/work request. This likelihood can be maximized by searching past execution histories of various resources for similar types of UOWs/work requests, determining what day/time of day is typically most open for a resource (e.g., a particular resource may have a history of being or at near idle between midnight a 6:00 AM), determining where a resource is located (e.g., resources on the other side of the world are likely to be available when it is daytime locally, due to the time zone difference that would put the remote resource in a time zone in which it is currently nighttime), etc.

These objectives are exemplary in nature, and should not be construed as limiting the scope of the present disclosure.

As noted above, one or more of the objectives (described by a linear problem) may be subject to one or more constraints.

In one embodiment, a constraint to the linear problem may be on the ownership of the resource. For example, there may be a constraint that 50% of the UOWs from the work request execute on a local system, while the other 50% of the UOW from that work request are to execute on a remote system, such as a cloud system.

In one embodiment, a constraint may be on the resource itself. For example, one resource may be a system that stores confidential data. If the UOW is to retrieve this confidential data, then the data would first have to be encrypted, if such encryption is allowed. Otherwise, this system would not qualify for use. Similarly, some systems may have local rule constraints. For example, one country may have a rule that any genealogical data must be de-identified (i.e., names removed). If this UOW can still use such data in this de-identified format, then the constraint on that resource has been met with respect to this UOW. However, if the UOW must have the names in the data, then this resource fails this constraint.

In one embodiment, the constraint on the resource is for reliability. For example, the constraint may require that a system be 99.9% reliable with respect to being "up" (the system is capable of receiving and processing jobs), meeting certain turnaround/speed times, using less than some predetermined amount of energy per job/unit of time (i.e., is environmentally "green"), having experience in executing this type of UOW, etc.

By utilizing the constraint programming described above, a best candidate system for executing a UOW is identified (block 114). If this best candidate system is not available at run time (query 116), then the next best candidate system is identified (block 114). As soon as the best/next best candidate is located and deemed available (query block 116), then the UOW is sent to that system for execution (block 118). The process continues in a reiterative manner (blocks 112-118) until all UOWs in the work project have been executed (query block 120), and the executed UOWs are assembled into a unitary solution (block 122). The process ends at terminator block 124.

Consider now the following exemplary use of linear programming that incorporates the processes described herein. Assume that a company must run five units of work (UOWs) and has five cloud computer systems (shown as "Machines 1-5" in the tables below) available for use. The processing time (in hours) per UOW processed varies from cloud to cloud due to CPU speed, memory, and disk access times:

TABLE I

|  | Machine1 | Machine2 | Machine3 | Machine4 | Machine5 |
|---|---|---|---|---|---|
| UOW1 | 1 | 5 | 8 | 4 | 3 |
| UOW2 | 3 | 4 | 6 | 6 | 2 |
| UOW3 | 8 | 10 | 12 | 5 | 4 |
| UOW4 | 7 | 10 | 12 | 5 | 4 |
| UOW5 | 4 | 5 | 2 | 1 | 1 |

Similarly the cost per CPU hour varies from cloud to cloud.

TABLE II

|  | Machine1 | Machine2 | Machine3 | Machine4 | Machine5 |
|---|---|---|---|---|---|
| Cost/Hour | 20 | 10 | 15 | 20 | 18 |

Assume also that the UOWs are to run during a company's third shift, during which there are eight run time hours available from each cloud. Assume also that each unit of work must be run once, and only once.

The use case/problem is thus formulated as an integer programming problem:

$$\text{Minimize} \sum_{i=1}^{m} \sum_{j=1}^{u} H_{i,j} * D_{i,j} * P_j$$

where:
u=number of Units of Work
m=number of machines $H_{i,j}$=Run time of $UOW_i$ on $Machine_j$ in hours
$D_{i,j}$=Dispatch of $UOW_i$ to $Machine_j$
$P_j$=Cost per hour on $Machine_j$ The goal of the problem is to minimize the cost of running all the UOWs, subject to:
1) Each machine must be able to complete all of its assigned UOWs within an 8 hour window:

$$\text{For all } i, \sum_{j} H_{i,j} * D_{i,j} \leq 8 \text{ hours}$$

and 2) every UOW must be run once and only once:

$$\text{For all } j, \sum_{i} D_{i,j} = 1$$

Note that the assignment of a UOW to a machine is a binary variable. Thus, D is 1 if UOW "i" is assigned to machine "j", and 0 otherwise, as described in:

$D_{i,j} \epsilon 0,1$

The solution reached using the formulas/constraints shown above results in the following solution tables, in which each UOW is run a total of one time on one machine, and each machine can run as many jobs as possible subject to the total 8-hour constraint:

TABLE III

|  | Machine 1 | Machine 2 | Machine 3 | Machine 4 | Machine 5 | Total |
|---|---|---|---|---|---|---|
| UOW1 | 1 |  |  |  |  | 1 |
| UOW2 |  | 1 |  |  |  | 1 |
| UOW3 |  |  |  |  | 1 | 1 |
| UOW4 |  |  |  |  | 1 | 1 |
| UOW5 |  |  |  | 1 |  | 1 |
| Num of Jobs | 1 | 1 |  | 1 | 2 | 5 |

Note that, under the resulting solution, cloud machine 3 does not run any jobs and cloud machine 5 runs two jobs. The number of hours needed to execute each UOW in a particular machine are extracted from TABLE I, and presented in TABLE IV:

TABLE IV

|  | Machine1 | Machine2 | Machine3 | Machine4 | Machine5 |
|---|---|---|---|---|---|
| UOW1 | 1 |  |  |  |  |
| UOW2 |  | 4 |  |  |  |
| UOW3 |  |  |  |  | 4 |
| UOW4 |  |  |  |  | 4 |
| UOW5 |  |  |  | 1 |  |
| Total Hours | 1 | 4 |  | 1 | 8 |

Each machine has its own cost per hour:

TABLE V

|  | Machine1 | Machine2 | Machine3 | Machine4 | Machine5 |
|---|---|---|---|---|---|
| Cost/Hour | 20 | 10 | 15 | 20 | 18 |

Thus, the cost of running UOW1-UOW5 is computed as the number of hours to run the job multiplied by the cost per hour, as shown in TABLE VI:

TABLE VI

|  | Machine1 | Machine2 | Machine3 | Machine4 | Machine5 |
|---|---|---|---|---|---|
| UOW1 | 20 |  |  |  |  |
| UOW2 |  | 40 |  |  |  |
| UOW3 |  |  |  |  | 72 |
| UOW4 |  |  |  |  | 72 |
| UOW5 |  |  |  | 20 |  |
| Machine Cost | 20 | 40 |  | 20 | 144 |

Therefore, the total cost of running these sets of UOWs is 224 (20+40+20+144) units of cost.

As reflected above, it will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer implemented method of optimizing systems usage, the computer implemented method comprising:
    a processor receiving a work request;
    the processor decomposing the work request into units of work;
    the processor retrieving a first unit of work from the units of work;
    the processor selectively sending the first unit of work to a first system or a second system for execution based on a first work constraint on the first unit of work, wherein the first work constraint limits execution of the first unit of work to a system that is compliant with an execution environment rule for the first unit of work; and
    the processor minimizing a cost of running multiple units of work according to an algorithm:

$$\text{Minimize} \sum_{i=1}^{m} \sum_{j=1}^{u} H_{i,j} * D_{i,j} * P_j$$

where: u=a quantity of units of work to be executed, m=a quantity of machines available to a specific cloud computer system, $H_{i,j}$=a run time in hours for each unit of work i on each machine j, $D_{i,j}$=a dispatch of said each unit of work i on said each machine j, and $P_j$=a cost hour for using said each machine j.

2. The computer implemented method of claim 1, wherein the first system is a first local system, and wherein the second system is a first cloud system that provides on-demand network access to a shared pool of configurable computing resources.

3. The computer implemented method of claim 2, further comprising:
    the processor sending the first unit of work to the first local system in response to determining that a transmission line to the first cloud system is overloaded.

4. The computer implemented method of claim 2, further comprising:
    the processor sending the first unit of work to the first local system in response to determining that the first work constraint on the first unit of work is a prohibition against transmitting data related to the first unit of work over a transmission line to the first cloud system.

5. The computer implemented method of claim 2, further comprising:
    the processor sending the first unit of work to the first cloud system in response to determining that the first work constraint on the first unit of work is a security constraint that prohibits the first unit of work from executing in the first local system.

6. The computer implemented method of claim 2, further comprising:
    the processor sending the first unit of work to the first cloud system in response to determining that the first work constraint on the first unit of work is a legal constraint that prohibits the first unit of work from executing in the first local system.

7. The computer implemented method of claim 1, wherein the second system is a first cloud system to which the first unit of work was selectively sent, and wherein the computer implemented method further comprises:
    the processor creating a second cloud system in response to determining that the first unit of work has not completed executing in the first cloud system within a predetermined amount of time; and
    the processor sending the first unit of work to the second cloud system for execution.

8. The computer implemented method of claim 1, wherein the second system is a first cloud system to which the first unit of work was selectively sent, and wherein the computer implemented method further comprises:
    the processor also sending the first unit of work to a second cloud system; and
    the processor, in response to receiving a completed output of the first unit of work from the second cloud system without receiving the completed output of the first unit of work from the first cloud system, cancelling execution of the first unit of work in the first cloud system, wherein the first cloud system is executing the first unit of work at a slower rate than the second cloud system.

9. The computer implemented method of claim 1, further comprising:
    the processor determining that the first work constraint on the first unit of work is a price budget; and
    the processor selectively sending the first unit of work to a first local system or a first cloud system for execution depending on which system is cheaper.

10. The computer implemented method of claim 1, wherein the second system is a first cloud system to which the first unit of work was selectively sent, wherein resources in the first cloud system are physically located within a first time zone, and wherein the computer implemented method further comprises:
the processor identifying additional resources in a second time zone; and
the processor organizing the additional resources in the second time zone into a second cloud system for executing subsequent units of work from the work request.

11. The computer implemented method of claim 1, wherein multiple units of work are run on multiple cloud computer systems within a predetermined length of time, and wherein each unit of work from the multiple units of work run once and only once.

12. A computer program product for optimizing systems usage, the computer program product comprising:
a non-transitory computer readable storage media;
first program instructions to receive a work request;
second program instructions to decompose the work request into units of work;
third program instructions to retrieve a first unit of work from the units of work;
fourth program instructions to selectively send the first unit of work to a first system or a second system for execution based on a first work constraint on the first unit of work, wherein the first work constraint limits execution of the first unit of work to a system that is compliant with an execution environment rule for the first unit of work; and
fifth program instructions to minimize a cost of running multiple units of work according to an algorithm:

$$\text{Minimize} \sum_{i=1}^{m} \sum_{j=1}^{u} H_{i,j} * D_{i,j} * P_j$$

where: u=a quantity of units of work to be executed, m=a quantity of machines available to a specific cloud computer system, $H_{i,j}$=a run time in hours for each unit of work i on each machine j, $D_{i,j}$=a dispatch of said each unit of work i on said each machine j, and $P_j$=a cost hour for using said each machine j; and wherein
the first, second, third, fourth, and fifth program instructions are stored on the non-transitory computer readable storage media.

13. The computer program product of claim 12, wherein the first system is a first local system, and wherein the second system is a first cloud system that provides on-demand network access to a shared pool of configurable computing resources.

14. The computer program product of claim 13, further comprising:
sixth program instructions to send the first unit of work to the first local system in response to determining that a transmission line to the first cloud system is overloaded; and wherein the sixth program instructions are stored on the non-transitory computer readable storage media.

15. The computer program product of claim 12, wherein the second system is a first cloud system to which the first unit of work was selectively sent, and wherein the computer program product further comprises:
sixth program instructions to create a second cloud system in response to determining that the first unit of work has not completed executing in the first cloud system within a predetermined amount of time; and
seventh program instructions to send the first unit of work to the second cloud system for execution;
and wherein the sixth and seventh program instructions are stored on the non-transitory computer readable storage media.

16. A computer system comprising:
a central processing unit (CPU), a computer readable memory, and a computer readable storage media;
first program instructions to receive a work request;
second program instructions to decompose the work request into units of work;
third program instructions to retrieve a first unit of work from the units of work;
fourth program instructions to selectively send the first unit of work to a first system or a second system for execution based on a first work constraint on the first unit of work, wherein the first work constraint limits execution of the first unit of work to a system that is compliant with an execution environment rule for the first unit of work; and
fifth program instructions to minimize a cost of running multiple units of work according to an algorithm:

$$\text{Minimize} \sum_{i=1}^{m} \sum_{j=1}^{u} H_{i,j} * D_{i,j} * P_j$$

where: u=a quantity of units of work to be executed, m=a quantity of machines available to a specific cloud computer system, $H_{i,j}$=a run time in hours for each unit of work i on each machine j, $D_{i,j}$=a dispatch of said each unit of work i on said each machine j, and $P_j$=a cost per hour for using said each machine j; and wherein
the first, second, third, fourth, and fifth program instructions are stored on the non-transitory computer readable storage media for execution by the CPU via the computer readable memory.

17. The computer system of claim 16, wherein the first system is a first local system, and wherein the second system is a first cloud system that provides on-demand network access to a shared pool of configurable computing resources.

18. The computer system of claim 17, further comprising:
sixth program instructions to send the first unit of work to the first local system in response to determining that a transmission line to the first cloud system is overloaded; and wherein the fifth program instructions are stored on the computer readable storage media for execution by the CPU via the computer readable memory.

19. The computer system of claim 17, wherein the second system is a first cloud system to which the first unit of work was selectively sent, and wherein the computer program product further comprises, and wherein the computer system further comprises:
sixth program instructions to retrieve a second unit of work from the units of work;
seventh program instructions to selectively send the second unit of work to the first cloud system or a second cloud system for execution depending on a second work constraint on the second unit of work; and
eighth program instructions to assemble work outputs from the first and second cloud systems for the first and second units of work into a unitary product; and wherein the sixth, seventh, and eighth program instructions are stored on the computer readable storage media execution by the CPU via the computer readable memory.

* * * * *